(12) United States Patent
Zhang et al.

(10) Patent No.: US 11,194,807 B2
(45) Date of Patent: Dec. 7, 2021

(54) QUERY PROCESSING METHOD, QUERY PROCESSING SYSTEM, SERVER AND COMPUTER READABLE MEDIUM

(71) Applicant: Beijing Baidu Netcom Science and Technology Co., Ltd., Beijing (CN)

(72) Inventors: Gang Zhang, Beijing (CN); Dayu Shen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/709,591

(22) Filed: Dec. 10, 2019

(65) Prior Publication Data

US 2020/0372027 A1    Nov. 26, 2020

(30) Foreign Application Priority Data

May 21, 2019  (CN) .......................... 201910426050.9

(51) Int. Cl.
*G06F 16/2453* (2019.01)
*G06F 16/28* (2019.01)
*G06F 16/248* (2019.01)

(52) U.S. Cl.
CPC ...... *G06F 16/24542* (2019.01); *G06F 16/248* (2019.01); *G06F 16/283* (2019.01); *G06F 16/284* (2019.01)

(58) Field of Classification Search
None
See application file for complete search history.

(56) References Cited

U.S. PATENT DOCUMENTS

| 8,170,981 | B1 | 5/2012 | Tewksbary |
| 2003/0036919 | A1 | 2/2003 | Felt et al. |
| 2017/0172776 | A1 | 6/2017 | Liu et al. |

(Continued)

FOREIGN PATENT DOCUMENTS

| CN | 101566986 A | 10/2009 |
| CN | 101697170 A | 4/2010 |

(Continued)

OTHER PUBLICATIONS

Naver D2, "Big data multidimensional analysis system development using Kudu," published Mar. 22, 2018 (104 pages w/ English translation).

*Primary Examiner* — Wilson Lee
(74) *Attorney, Agent, or Firm* — Nixon Peabody LLP

(57) ABSTRACT

A query processing method. A server node parses a query request and generates a corresponding logical plan; judges the logical plan belonging to an OLAP scale query service or an OLTP scale query service; in response to judging that the logical plan belongs to the OLAP scale query service, segmenting the logical plan into logical subplans. A coordinator node generates a first physical plan corresponding to the logical plan, and feeds back the first physical plan to the server node. The server node assigns each of the logical subplans to the corresponding worker node according to the first physical plan. The worker node processes the corresponding logical subplan to obtain a query subresult, and reports the processing subresult layer by layer. The server node summarizes the received processing subresult, generates a final query result, and feeds back the final query result to a user.

16 Claims, 9 Drawing Sheets

(56) References Cited

U.S. PATENT DOCUMENTS

| | | |
|---|---|---|
| 2017/0329835 A1 | 11/2017 | Lee et al. |
| 2018/0089268 A1* | 3/2018 | Lee ................... G06F 16/24537 |
| 2019/0196914 A1* | 6/2019 | Goikhman .......... G06F 11/1451 |
| 2019/0220464 A1* | 7/2019 | Butani ................ G06F 16/2455 |
| 2019/0258732 A1* | 8/2019 | Chakra ............. G06F 16/24545 |
| 2020/0042628 A1* | 2/2020 | Foo ................... G06F 16/24549 |

FOREIGN PATENT DOCUMENTS

| | | |
|---|---|---|
| CN | 103324724 A | 9/2013 |
| CN | 103942342 A | 7/2014 |
| CN | 104903887 A | 9/2015 |
| CN | 105824957 A | 8/2016 |
| CN | 106649687 A | 5/2017 |
| JP | 1995078118 A | 3/1995 |
| JP | 2004536402 A | 12/2004 |
| JP | 2012138082 A | 7/2012 |
| JP | 2014120153 A | 6/2014 |
| KR | 20140098529 A | 8/2014 |
| KR | 101562359 B1 | 10/2015 |

\* cited by examiner

QUERY PROCESSING METHOD, QUERY PROCESSING SYSTEM, SERVER AND COMPUTER READABLE MEDIUM

CROSS-REFERENCE TO RELATED APPLICATIONS

This application claims priority to Chinese Patent Application No. 201910426050.9, filed on May 21, 2019, titled "Query processing method, query processing system, server and computer readable medium," which is hereby incorporated by reference in its entirety.

TECHNICAL FIELD

Embodiments of the present disclosure relate to the fields of Internet of Things technology and cloud computing, particularly to a query processing method, a query processing system, a server and a computer readable medium.

BACKGROUND

In the field of Internet of Things, the importance of data to an enterprise is immeasurable. By mining the values behind data, the past may be analyzed, the present may be monitored and a decision may be made on the future. An important part of such process is data query.

Data types in the field of Internet of Things are diversified, and the volume of data is quantified. A query scene covers an On-Line Analysis Processing (OLAP for short) scale query service and an On-Line Transaction Processing (OLTP for short) scale query service. Existing data query engines are difficult to support both the OLAP scale query service and the OLTP scale query service, that is, the existing data query technologies cannot meet a query requirement in the Internet of Things field.

SUMMARY

Embodiments of the present disclosure provide a query processing method, a query processing system, a server and a computer readable medium, so as to solve at least one of the problems exist in the existing art.

In a first aspect, an embodiment of the present disclosure provides a query processing method, including: parsing, by a server node, a query request and generating a corresponding logical execution plan; judging, by the server node, that the logical plan belongs to an OLAP scale query service or an OLTP scale query service; in response to judging that the logical plan belongs to the OLAP scale query service, segmenting, by the server node, the logical plan into a plurality of logical subplans, and transmitting the segmented logical plan to a coordinator node; generating, by the coordinator node, a first physical plan corresponding to the logical plan, and feeding back the first physical plan to the server node, the first physical plan recording node information of a worker node corresponding to each of the logical subplans; assigning, by the server node, each of the logical subplans to a corresponding worker node according to the first physical plan; processing, by the worker node, the corresponding logical subplan to obtain a query subresult, and reporting the processing subresult layer by layer; and summarizing, by the server node, the received processing subresult, generating a final query result, and feeding back the final query result to a user.

In some embodiments, in response to judging that the logical plan belongs to the OLTP scale query service, transmitting, by the server node, the logical plan to the coordinator node; generating, by the coordinator node, a second physical plan corresponding to the logical plan, and feeding back the second physical plan to the server node, the second physical plan recording node information of the worker node corresponding to the logical plan; assigning, by the server node, the logical plan to the corresponding worker node according to the second physical plan; processing, by the worker node, the corresponding logical plan to obtain a final query result, and uploading the final query result to the server node; and feeding back, by the server node, the received final query result to the user.

In some embodiments, the judging, by the server node, that the logical plan belongs to an OLAP scale query service or an OLTP scale query service includes: inquiring, by the server node, of a storage node about a data volume of each data source associated with the logical plan; estimating, by the server node, a total data query volume corresponding to the logical plan according to the data volume, of the each data source associated with the logical plan, fed back by the storage node; comparing, by the server node, the total data query volume and a predetermined total query volume; judging, by the server node, that the logical plan belongs to the OLAP scale query service in response to determining the total data query volume being greater than the predetermined total query volume, and judging, by the server node, that the logical plan belongs to the OLTP scale query service in response to determining the total data query volume being less than or equal to the predetermined total query volume.

In some embodiments, the processing, by the worker node, the corresponding logical subplan includes: detecting, by the worker node, that the received logical subplan belongs to the query plan or the aggregation plan; in response to detecting that the received logical subplan belongs to the query plan, forwarding, by the worker node, the logical subplan to a storage node for the storage node to construct a database for the logical subplan; and executing, by the worker node, a corresponding query operation in the database for the logical subplan constructed by the storage node, to obtain a corresponding query subresult, where when the storage node receives the logical subplan from the worker node, the method further comprises: constructing, by the storage node, a database for the logical subplan.

In some embodiments, in response to detecting that the received logical subplan belongs to the aggregation plan, receiving, by the worker node, a query subresult reported by a lower-level worker node, and aggregating the received query subresult.

In some embodiments, the constructing, by the storage node, a database for the logical subplan includes: acquiring, by the storage node, a data table provided by a data source associated with the logical subplan according to the received logical subplan; judging, by the storage node, whether a quantity of data sources associated with the logical subplan is greater than one; in response to judging that the quantity of data sources associated with the logical subplan is greater than one, mapping, by the storage node, the data table provided by each data source associated with the logical subplan to a relational database; and in response to judging that the quantity of data sources associated with the logical subplan is equal to one, taking, by the storage node, the data table provided by the one data source associated with the logical subplan as a database.

In some embodiments, the acquiring, by the storage node, a data table provided by a data source associated with the logical subplan according to the received logical subplan includes: determining, by the storage node, the data source associated with the logical subplan; determining, by the storage node, from a pre-stored corresponding relationship table, a preferred processing field corresponding to each data source associated with the logical subplan, the corresponding relationship table recording different data sources and corresponding preferred processing fields; for each data source associated with the logical subplan, judging, by the storage node, whether a preferred processing field corresponding to the data source associated with the logical subplan is a query field of a query condition included in the logical subplan; in response to judging that the preferred processing field corresponding to the data source is a query field of the query condition included in the logical subplan, transmitting, by the storage node, a query condition of the preferred processing field corresponding to the data source in the logical subplan to the data source, for the data source to filter a data table stored in the data source according to the received query condition and then feeding back the filtered data table to the storage node; and in response to judging that the preferred processing field corresponding to the data source is not a query field of the query condition included in the logical subplan, transmitting, by the storage node, a data acquisition request to the data source, for the data source to feed back its own data table.

In some embodiments, before parsing, by the server node, the query request and generating the corresponding logical execution plan, the method further includes: performing, by a meta information management node, effectiveness verification on user identity information; parsing, by the server node, the query request and generating the corresponding logical plan in response to that the user identity information passes the effectiveness verification; and feeding back, by the meta information management node, identity information verification failure information to the user in response to that the user identity information fails to pass the effectiveness verification.

In a second aspect, an embodiment of the present disclosure provides a query processing system, including a server node, a coordinator node and a plurality of worker nodes, where the server node includes a parsing module, a first judging module, a segmenting module, a first assigning module, a summarizing module and a first feedback module; the coordinator node includes a first generating module; the worker node includes a first processing module; the parsing module is configured for parsing a query request and generating a corresponding logical plan; the first judging module is configured for judging that the logical plan belongs to an OLAP scale query service or an OLTP scale query service; the segmenting module is configured for segmenting the logical plan into a plurality of logical subplans in response to the first judging module judging that the logical plan belongs to the OLAP range query service, and transmitting the segmented logical plan to the coordinator node; the first generating module is configured for generating a first physical plan corresponding to the logical plan, and feeding back the first physical plan to the server node, the first physical plan recording node information of a worker node corresponding to each of the logical subplans; the first assigning module is configured for assigning each of the logical subplans to a corresponding worker node according to the first physical plan; the first processing module is configured for processing the corresponding logical subplan to obtain a query subresult, and reporting the processing subresult layer by layer; the summarizing module is configured for summarizing the received processing subresult and generating a final query result; and the first feedback module is configured for feeding back the final query result to a user.

In some embodiments, the server node further includes a transmitting module, a second assigning module and a second feedback module; the coordinator node further includes a second generating module; the worker node further includes a second processing module; the transmitting module is configured for transmitting the logical plan to the coordinator node in response to the first judging module judging that the logical plan belongs to the OLTP scale query service; the second generating module is configured for generating a second physical plan corresponding to the logical plan, and feeding back the second physical plan to the server node, the second physical plan recording node information of the worker node corresponding to each of the logical subplans; the second assigning module is configured for assigning each of the logical subplans to the corresponding worker node according to the second physical plan; the second processing module is configured for processing the corresponding logical plan to obtain a final query result, and uploading the final query result to the server node; and the second feedback module is configured for feeding back the final query result to the user.

In some embodiments, the query processing system further includes a storage node, where the storage node includes a storage module prestoring data volume information of each data source; the first judging module includes an inquiry unit, an estimating unit and a comparing unit; the inquiry unit is configured for inquiring of the storage node about a data volume of each data source associated with the logical plan; the estimating unit is configured for estimating a total data query volume corresponding to the logical plan according to the data volume, of the each data source associated with the logical plan, fed back by the storage node; the comparing unit is configured for comparing the total data query volume and a predetermined total query volume; the first judging module is configured for, in response to the comparing unit determining that the total data query volume is greater than the predetermined total query volume, judging that the logical plan belongs to the OLAP scale query service; and in response to the comparing unit determining that the total data query volume is less than or equal to the predetermined total query volume, judging that the logical plan belongs to the OLTP scale query service.

In some embodiments, the first processing module includes a first detecting unit, a forwarding unit and a query unit; the query processing system further includes a storage node including a constructing module; the first detecting unit is configured for detecting that the received logical subplan belongs to the query plan or the aggregation plan; the forwarding node is configured for forwarding the logical subplan to the storage node in response to detecting that the received logical subplan belongs to the query plan, for the storage node to construct a database for the logical subplan; the query unit is configured for executing a corresponding query operation in the database for the logical subplan constructed by the storage node, to obtain a corresponding query subresult; and the constructing module is configured for constructing a database for the logical subplan in response to receiving the logical subplan from the worker node.

In some embodiments, the first processing module further includes an aggregating unit; and the aggregating unit is configured for receiving a query subresult reported by a lower-level worker node and aggregating the received query subresult in response to the first detecting unit detecting that the received logical subplan belongs to the aggregation plan.

In some embodiments, the constructing module includes an acquiring unit, a judging unit and a processing unit; the acquiring unit is configured for acquiring a data table provided by a data source associated with the logical subplan according to the received logical subplan; the judging unit is configured for judging whether a quantity of data sources associated with the logical subplan is greater than one; and the processing unit is configured for mapping the data table provided by each data source associated with the logical subplan to a relational database in response to the judging unit judging that the quantity of data sources associated with the logical subplan is greater than one, and taking the data table provided by the one data source associated with the logical subplan as a database in response to the judging unit judging that the quantity of data sources associated with the logical subplan is equal to one.

In some embodiments, the acquiring unit includes a first determining subunit, a second determining subunit, a judging subunit, a first transmitting subunit and a second transmitting subunit; the first determining subunit is configured for determining a data source associated with the logical subplan; the second determining subunit is configured for determining, from a pre-stored corresponding relationship table, a preferred processing field corresponding to the each data source associated with the logical subplan, the corresponding relationship table recording different data sources and corresponding preferred processing field; the judging subunit is configured for, for each data source associated with the logical subplan, judging whether a preferred processing field corresponding to the data source associated with the logical subplan is a query field of a query condition included in the logical subplan; the first transmitting subunit is configured for transmitting a query condition of the preferred processing field corresponding to the data source in the logical subplan to the data source in response to the judging subunit judging that the preferred processing field corresponding to the data source is a query field of the query condition included in the logical subplan, for the data source to filter a data table stored in the data source according to the received query condition and then feed back the filtered data table to the storage node; and the second transmitting subunit is configured for transmitting a data acquisition request to the data source in response to the judging subunit judging that the preferred processing field corresponding to the data source is not a query field of the query condition included in the logical subplan, for the data source to feed back its own data table.

In some embodiments, the query processing system further includes a meta information management node, where the meta information management node includes a verification module and a third feedback module; the verification module is configured for performing effectiveness verification on user identity information; the third feedback information is configured for feeding back identity information verification failure information to the user in response to that the user identity information fails to pass the effectiveness verification; and the parsing module is configured for parsing the query request and generating the corresponding logical plan in response to that the user identity information passes the effectiveness verification.

In a third aspect, an embodiment of the present disclosure provides a server, including: one or more processors; and a storage apparatus, storing one or more programs, where the one or more programs, when executed by the one or more processors, cause the one or more processors to implement the method according to any one of the implementations in the first aspect.

In a fourth aspect, an embodiment of the present disclosure provides a computer readable medium, storing a computer program, where the program, when executed by a processor, implements the method according to any one of the implementations in the first aspect.

Embodiments of the present disclosure have the following beneficial effects.

Embodiments of the present disclosure provide a query processing method, which may select different processing flows on the basis of the scale of data corresponding to a query request, and the query processing method may simultaneously support an OLAP scale query service and an OLTP scale query service, thus meeting query needs in the field of Internet of Things.

In addition, for joint query across multiple data sources, some embodiments of the present disclosure provide a storage node which may map different data tables provided by different data sources to a form of a relational database, which makes a joint query across services become possible.

Moreover, for a user, the user may make a one-stop data query on multiple data sources only by using an SQL language, which is convenient for the user to operate.

DETAILED DESCRIPTION OF EMBODIMENTS

Figure 1:
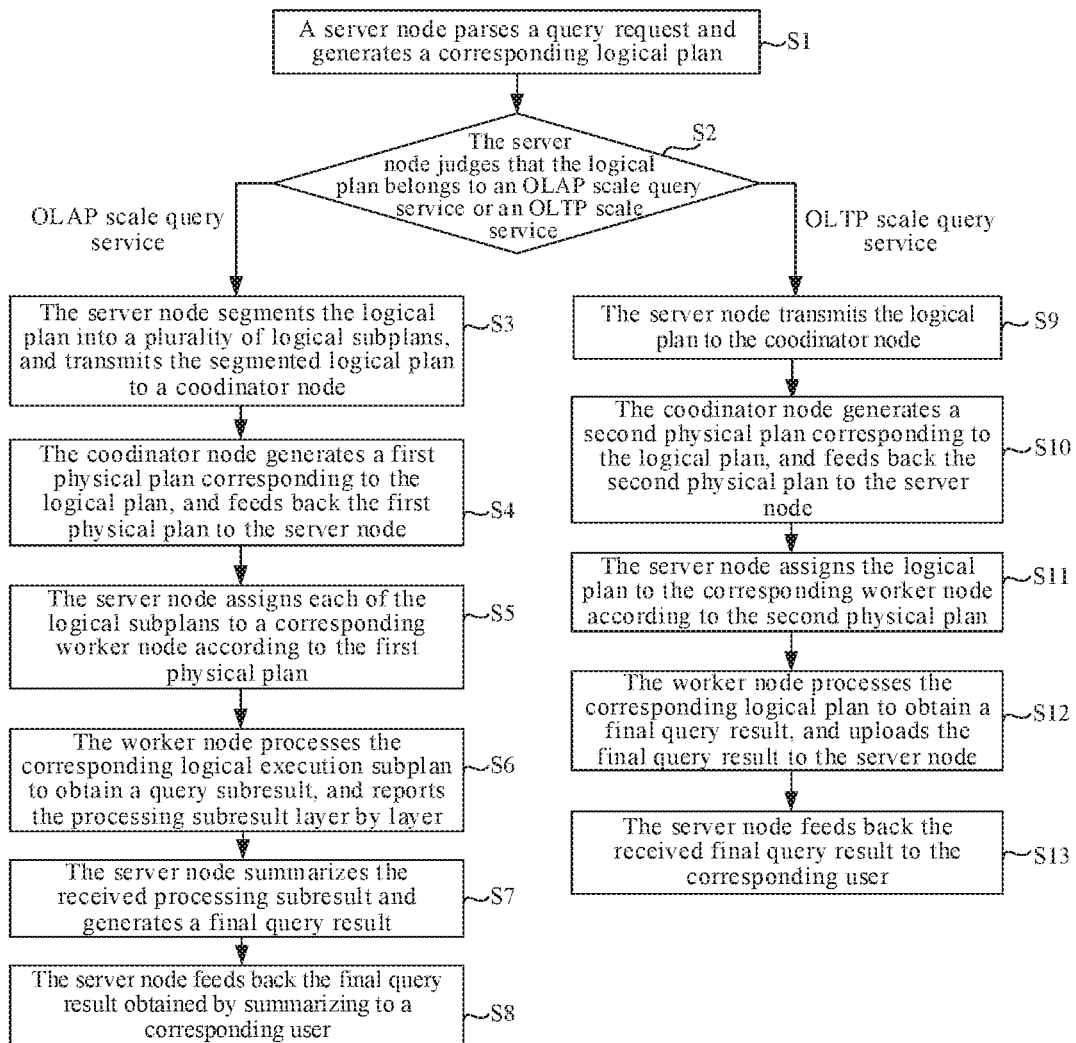
FIG. 1 is a flowchart of a query processing method provided by an embodiment of the present disclosure.

In order to enable those skilled in the art to better understand the technical solution of the present disclosure, a query processing method, a query processing system, a server and a computer readable medium provided by embodiments of the present disclosure are described in detail below with reference to the accompanying drawings.

Example embodiments are described more fully hereinafter with reference to the accompanying drawings, but such example embodiments may be embodied in different forms and should not be construed as limited to the embodiments set forth herein. Rather, these embodiments are provided to make the present disclosure thorough and complete and allow those skilled in the art to understand the scope of the present disclosure.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "includes," "comprises" and/or "made of . . . ," when used in this description, specify the presence of stated features, integers, steps, operations, elements, and/or components, but do not preclude the presence or addition of one or more other features, integers, steps, operations, element components, and/or groups thereof.

It will be understood that, although the terms first, second, etc. may be used herein to describe various elements, these elements should not be limited by these terms. These terms are only used to distinguish one element from another. Hence, a first element, a first component or a first part discussed below could be termed a second element, a second component or a second part, without departing from the teachings of the present disclosure.

Unless otherwise defined, all terms (including technical and scientific terms) used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the present field, a query service is divided into two categories of an OLAP scale query service and an OLTP scale query service, according to the total data query volume of a query process. The OLAP scale query service refers to a query service in which the total data query volume involved in the query process is greater than a predetermined threshold, while the OLTP scale query service refers to a query service in which the total data query volume involved in the query process is less than or equal to the predetermined threshold, and the value of the predetermined threshold may be set and adjusted according to actual conditions. The OLAP scale query service represents that the query process involves a large-volume (generally, the order of magnitude reaches "ten thousand") data, and the OLTP scale query service represents that the query process involves small-volume data.

In some embodiments of the present disclosure, structured query language (SQL for short) is used as a unified query language. The SQL is a standard computer language for accessing and processing a database, and is powerful and easy to learn. When a user needs to query data, the user inputs a query request into a client SDK with the SQL language, and the client SDK sends the query request to a server node. The "user" referred to in the following embodiments refers to the user who inputs the query request into the Client SDK.

The query processing method provided by some embodiments of the present disclosure is based on a corresponding query processing system, and the query processing system at least includes a server node, a coordinator node and a worker node.

The server node is an entry for receiving a query request, and is responsible for parsing a corresponding logical plan of the query request and segmenting the logical plan into a plurality of logical subplans under certain circumstances. In addition, a reset node may further issue the logical plan to a corresponding worker node according to a physical plan generated by the coordinator node.

The coordinator node manages the service node and all worker nodes in a system, has state information of each worker node (for example, current load, remaining resources and processing speed of the worker node), and may generate an actual physical plan by combining factors such as the current load and remaining resources of the each worker node according to the logical plan.

The worker node is responsible for executing the logical plan/subplan issued by the server node, and one of the worker nodes may process one or more logical plans/subplans. The logical subplan received by the worker node may be either a query plan or an aggregation plan. When the logical subplan received by the worker node is a query plan, the worker node performs a corresponding query operation. When the logical subplan received by the worker node is an aggregation plan, the worker node needs to wait for each subordinate worker node thereof (each child node of the worker node) to complete a query/aggregation operation and report corresponding data, and then the worker node aggregates the received data.

In order to facilitate those skilled in the art to better understand the technical solution of the present disclosure, a detailed description will be made below in conjunction with specific examples.

FIG. 1 is a flowchart of a query processing method according to an embodiment of the present disclosure. As shown in FIG. 1, the query processing method includes the following steps.

Step S1: a server node parses a query request and generates a corresponding logical plan.

The query request is an SQL query statement expressed in a SQL language. In step S1, a server node uses a command parser pre-stored therein to check the SQL query statement for syntax correctness, and parses the SQL query statement when it is detected that the syntax correctness is correct, so as to convert such statement into an internal format that a system may operate, that is, a logical plan. The logical plan is represented by a tree structure which may also be called a query tree, and the logical plan represents a processing logical step when the query request is executed.

The logical plan records the name of a data table of each data source associated with the query request and a query condition (also referred to as a filter condition) for querying the data table.

Step S2: the server node judges that the logical plan belongs to an OLAP scale query service or an OLTP scale query service.

Figure 2:
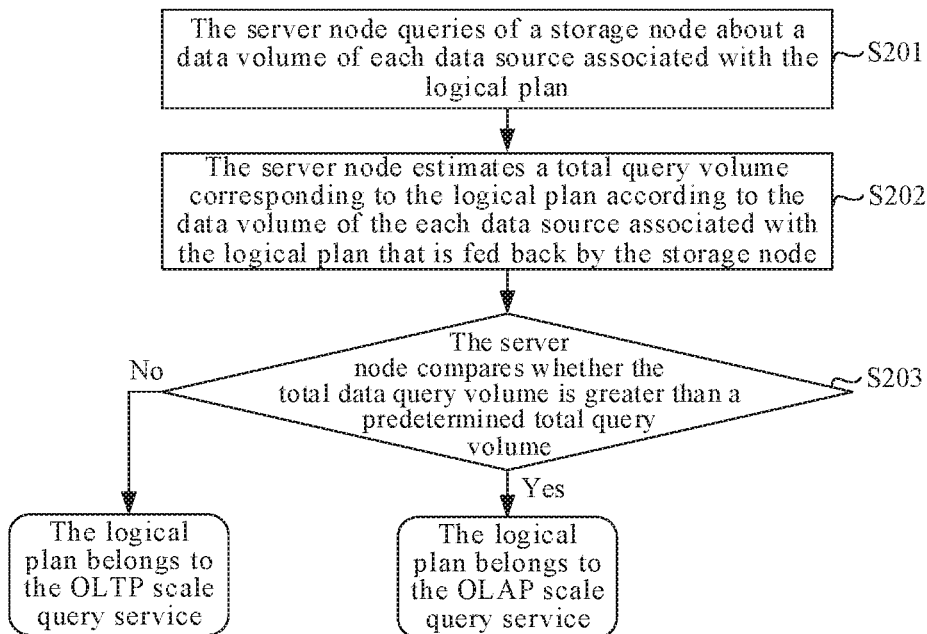
FIG. 2 is a flowchart of a specific implementation of step S2 according to an embodiment of the present disclosure.

FIG. 2 is a flowchart of a specific implementation of step S2 according to an embodiment of the present disclosure. As shown in FIG. 2, the query processing system in the present disclosure further includes a storage node, and the storage node is responsible for docking all Internet of Things service providers. The Internet of Things service provider, as a data source, may provide a corresponding data table for the storage node according to a request of the storage node, and the storage node monitors the volume of data in the data table of the each data source in real time.

It should be noted that the "data volume" in the present disclosure refers to the number of data records included in the data table (generally, one line of data in the data table indicates one data record).

The worker node may access the data table provided by the data source by means of the storage node. When the worker node needs to query heterogeneous data tables provided by different data sources at the same time, the storage node may map such heterogeneous data tables to a relational database so as to mask data structure differences among different data sources.

Step S2 specifically includes the following.

Step S201: the server node inquires of a storage node about a data volume of each data source associated with the logical plan.

In step S201, it is assumed that the number of data tables of the data source associated with the logical plan is n, the number of data records in a data table of the ith data source is Ki, where n is an integer greater than 1 and k is a positive integer less than or equal to n.

Step S202: the server node estimates a total data query volume corresponding to the logical plan according to the data volume of the each data source associated with the logical plan that is fed back by the storage node.

In step S202, on the basis of the data volume of each data source associated with the logical plan, the total data query volume corresponding to the logical plan may be estimated.

As an alternative, the following formula may be used to estimate the total data query volume S:

$$S = \prod_{i=1}^{n} K_i$$

It should be noted that the algorithm for estimating the total data query volume corresponding to the logical plan is only an alternative implementation in some embodiments of the present disclosure, and it does not impose any restriction on the technical solution of embodiments of the present disclosure. It should be understood by those skilled in the art that any algorithm used to estimate the total data query volume corresponding to the logical plan on the basis of the data volume of each data source associated with the logical plan should belong to the scope of protection of the present disclosure, and the specific algorithms are not exemplified here.

Step S203: the server node compares the total data query volume and a predetermined total query volume.

The predetermined total query volume (i.e., the "predetermined threshold") may be set and adjusted according to actual needs.

In step S203, if it is determined by comparing that the total data query volume is greater than the predetermined total query volume (large-volume data), the server node judges that the logical plan belongs to the OLAP scale query service; and if the total data query volume is less than or equal to the predetermined total query volume (small-volume data), the server node judges that the logical plan belongs to the OLTP scale query service.

In step S2, when it is judged that the logical plan belongs to the OLAP scale query service, step S3 is executed; and when it is judged in step S3 that the logical plan belongs to the OLTP scale query service, step S9 is executed.

Step S3: the server node segments the logical plan into a plurality of logical subplans, and transmits the segmented logical plan to a coordinator node.

When the server node judges that the logical plan belongs to the OLAP scale query service, a massively parallel processing (MPP for short) technology will be used for subsequent query, so as to improve the speed of the subsequent query.

In step S3, the server node segments the logical plan into a plurality of logical subplans according to a predetermined segmenting algorithm. It should be noted that the segmentation algorithm used in the present disclosure may be a segmentation algorithm conventionally used in an existing MPP architecture. In general, the total data query volume corresponding to each logical subplan obtained by segmentation with the MPP is average.

To facilitate understanding by those skilled in the art, a detailed description will be made below in conjunction with a specific example.

A query scenario is as follows: a customer needs to query heartbeat data of all server devices on Jan. 1, 2019, wherein device information (a device id) of the server devices is stored in a device table of a device management service provider (recorded as a hub), and the level of the data volume of the device table is about "ten thousand." The heartbeat data of each server device is stored in a heartbeat table of a timing sequence database service provider (denoted as tsdb), and the level of the data volume of the heartbeat table is about "hundred thousand." The device table and the heartbeat table are associated by means of the device id.

When a user makes a query, the user may input the following SQL statement into a Client SDK:

SELECT d.id, count(*) from hub.device d join tsdb.heartbeat h on d.id=h.deviceId
where h.timestamp between '2019-01-01' and '2019-01-02'
group by d.id Where hub.device indicates a device table (also denoted by d) in the device management service provider, d.id indicates that a field used to represent the device id in the device table is "id", h.timestamp indicates that a field characterizing a timestamp (generally accurate to the second) in the heartbeat table is "timestamp", h.deviceId indicates that a field representing the device id in the heartbeat table is "deviceId", and d.id=h.deviceId indicates that the field "id" in the device table is associated with the field "deviceId" in the heartbeat table.

The "h.timestamp between '2019-01-01' and '2019-01-02'" represents a query condition is the timestamp being Jan. 1, 2019, 0:0:00 to Jan. 2, 2019, 0:0:00.

Hence, it can be seen that the data source (and the corresponding data table) and the query condition associated with the query are directly recorded in the query request.

In the example, considering that the level of the data volume of the device table is about "ten thousand" and the level of the data volume of the heartbeat table is about "hundred thousand," by executing step S2, it may be estimated that the total data query volume of the query is "hundred million" and such query belongs to the OLAP scale query service.

Therefore, in step S3, the logical plan is segmented into a plurality of logical subplans (each logical subplan is also a query tree essentially). As an optional segmentation implementation, the logical plan may be subject to mechanical segmentation by the device id. Specifically, the logical plan is segmented into 100 logical subplans, where the Nth logical subplan is: acquiring heartbeat data of each server device (i.e., the server device whose hub.device.id %100 is equal to N) whose device id is divided by 100 and the remainder being equal to N on Jan. 1, 2019, where N is a positive integer less than or equal to 100. It should be noted that the 100 logical subplans are all query plans, only serve as an example role, and will not impose any restriction on the technical solution of the present disclosure.

It should be noted that in the process of segmenting the logical plan into a plurality of logical subplans, the obtained logical subplans may be not only the query plans but also aggregation plans, and the specific content may be referred to the subsequent description.

In step S3, after the logical plan is segmented, the server node packages all of the logical subplans together as a complete logical plan and sends the complete logical plan to a coordinator node.

Step S4: the coordinator node generates a first physical plan corresponding to the logical plan, and feeds back the first physical plan to the server node, the first physical plan recording node information of a worker node corresponding to each of the logical subplans.

Since the logical plan received by the coordinator node includes multiple logical subplans, the coordinator node may also recognize that the query is the OLAP scale query service.

In step S4, the coordinator node configures a corresponding worker node for each logical subplan on the basis of a minimum cost algorithm according to monitored information such as current load, remaining resources and processing speed of each worker node. It should be noted that the specific process of assigning a worker node corresponding to the logical subplan according to the minimum cost algorithm belongs to a conventional technology in the art and will not be detailed herein.

The coordinator node establishes each logical subplan and a node IP address of the corresponding worker node so as to generate a first physical plan, and feeds back the first physical plan to the server node.

It should be noted that in the process of assigning a worker node for the logical subplans, different logical subplans may be assigned to different worker nodes or may be assigned to the same worker node.

Step S5: the server node assigns each of the logical subplans to the corresponding worker node according to the first physical plan.

Step S6: the worker node processes the corresponding logical subplan to obtain a query subresult, and reports the processing subresult layer by layer.

Figure 3:
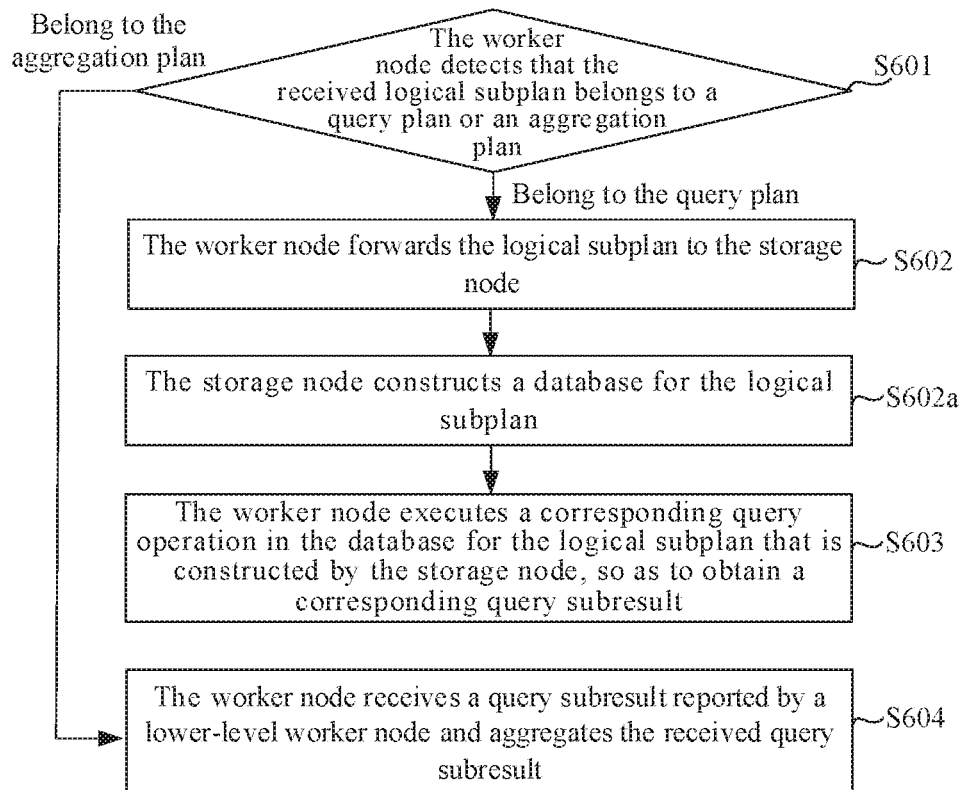
FIG. 3 is a flowchart of a specific implementation of step S6 according to an embodiment of the present disclosure.

FIG. 3 is a flowchart of a specific implementation of step S6 according to an embodiment of the present disclosure. As shown in FIG. 3, step S6 includes the following.

Step S601: the worker node detects that the received logical subplan belongs to a query plan or an aggregation plan.

In step S601, the worker node executes step S602 in response to detecting that the received logical subplan belongs to a query plan; and executes step S604 in response to detecting that the received logical subplan belongs to an aggregation plan.

Step S602: the worker node forwards the logical subplan to the storage node, for the storage node to construct a database for the logical subplan.

In step S602, the worker node forwards the logical subplan to the storage node, and the storage node constructs a database for the logical subplan on the basis of the received logical subplan, and a data table acquired from a corresponding data source.

Step S603: the worker node executes a corresponding query operation in the database for the logical subplan that is constructed by the storage node, so as to obtain a corresponding query subresult.

Step S604: the worker node receives a query subresult reported by a lower-level worker node and aggregates the received query subresult.

It should be noted that when the logical subplan received by the worker node belongs to the aggregation plan, the worker node necessarily has a lower-level worker node (also referred to as a child node of the worker node).

In step S604, after all lower-level worker nodes of a worker node executing the aggregation plan complete the execution of the corresponding logical subplans and complete data reporting, the worker node executing the aggregation plan aggregates all the received data, and continues to report the data obtained by the aggregation process.

Between step S602 and step 603, the method further includes a step S602a, including: the storage node constructing a database for the logical subplan.

Figure 4:
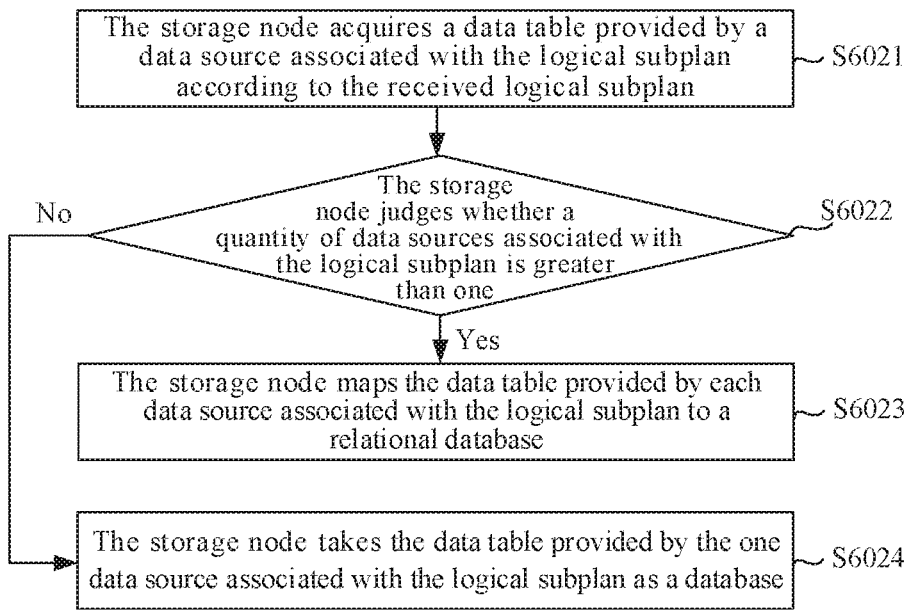
FIG. 4 is a flowchart of a specific implementation of step S602a according to an embodiment of the present disclosure.

FIG. 4 is a flowchart of a specific implementation of step S602a according to an embodiment of the present disclosure. As shown in FIG. 4, as an optional implementation of implementing step S602a, the step S602a includes a step S6021, including: the storage node acquiring a data table provided by a data source associated with the logical subplan according to the received logical subplan.

Figure 5:
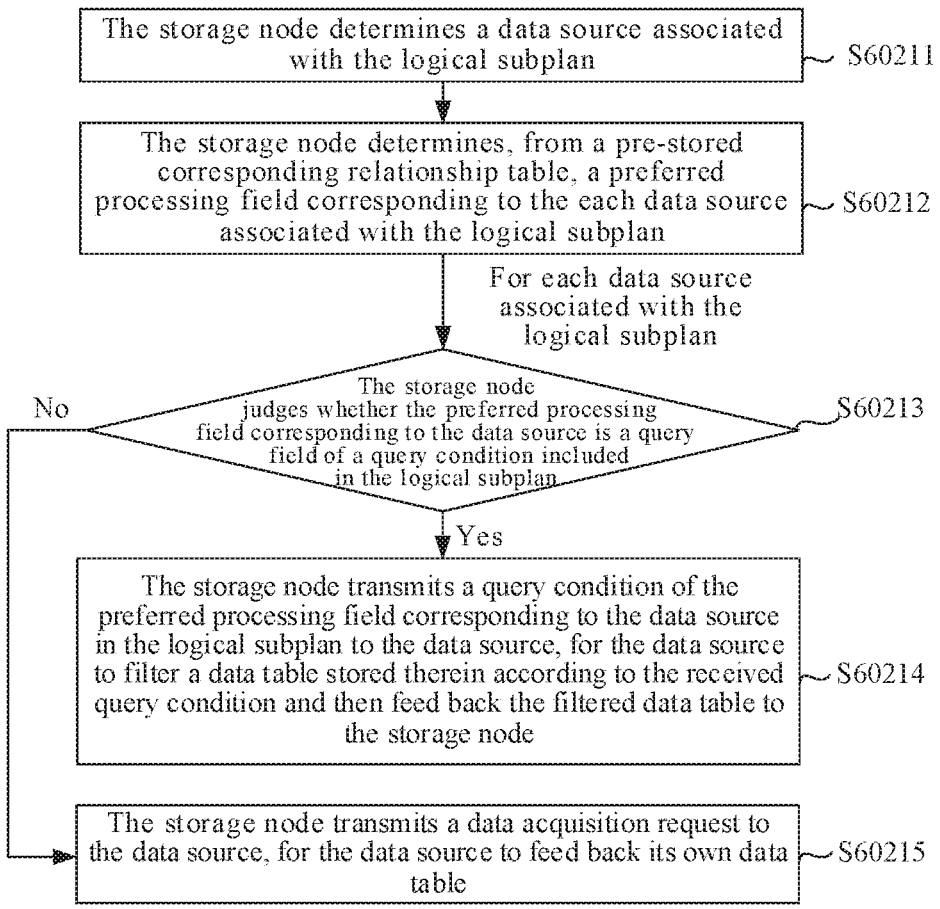
FIG. 5 is a flowchart of a specific implementation of step S6021 according to an embodiment of the present disclosure.

FIG. 5 is a flowchart of a specific implementation of step S6021 according to an embodiment of the present disclosure. As shown in FIG. 5, as a preferred implementation of implementing step S6021, the step S6021 includes the following steps.

Step s60211: the storage node determines a data source associated with the logical subplan.

Step S60212: the storage node determines, from a pre-stored corresponding relationship table, a preferred processing field corresponding to the each data source associated with the logical subplan, the corresponding relationship table recording different data sources and corresponding preferred processing fields.

In practical applications, considering that different data sources (Internet of Things service providers) themselves will exhibit different query performance for different query fields (determined by each service provider's own special service scenario), that is, for a specific data source, the data source may exhibit a better query performance for one or several query fields, the query field for which the data source exhibits a better query performance may be configured as a preferred processing field corresponding the data source. For example, considering that a timing sequence database service provider itself has a better query performance for a query condition whose query field is "timestamp", the preferred processing field whose data source is the timing sequence database service provider may be set as "timestamp". The corresponding preferred processing field may be pre-configured for the data source manually, and the preferred processing field corresponding to each data source is recorded in a corresponding relationship table, the corresponding relationship table pre-stored in the storage node.

In order to facilitate those skilled in the art to better understand the technical solution of the present disclosure, exemplary description will be provided with the scenario in which the customer needs to query the heartbeat data of all server devices on Jan. 1, 2019 as an example. It is assumed that the device management service provider does not have a corresponding preferred processing field, and the preferred processing field corresponding to the timing sequence database service provider is "timestamp".

The Nth logical subplan is assigned to the Nth worker node, and the Nth worker node needs to acquire heartbeat data of each server device whose device id satisfying hub.device.id %100=N on Jan. 1, 2019.

At this time, the Nth logical subplan is associated with 1) the device management service provider and 2) the timing sequence database service provider. A query condition corresponding to the Nth logical subplan is 1) hub.device.id %100=N and 2) h.timestamp between '2019-01-01' and '2019-01-02'.

In step 60212, it may be determined that the preferred processing field corresponding to the device management service provider associated with the Nth logical subplan is empty, and the preferred processing field corresponding to the timing sequence database service provider associated with the Nth logical subplan is "timestamp".

The following step S60213 is executed for each data source associated with the logical subplan.

Step S60213: the storage node judges whether the preferred processing field corresponding to the data source is a query field of a query condition included in the logical subplan.

In step S60213, if it is judged that the preferred processing field corresponding to the data source is a query field of the query condition included in the logical subplan, step S60214 is executed; and if it is judged that the preferred processing field corresponding to the data source is not a query field of the query condition included in the logical subplan, step S60215 is executed.

Step S60214: the storage node transmits a query condition of the preferred processing field corresponding to the data source in the logical subplan to the data source, for the data source to filter a data table stored therein according to the received query condition and then feed back the filtered data table to the storage node.

Step S60215: the storage node transmits a data acquisition request to the data source, for the data source to feed back its own data table.

The steps S60213 to S60215 are subject to exemplary description with the process of processing the Nth logical subplan as an example.

For the data source being the device management service provider, since the corresponding preferred processing field thereof is empty, it is determined in step S60213 that the preferred processing field corresponding to the device management service provider is not a query field of the query condition included in the logical subplan, step S60215 will be executed after step S60213, that is, the storage node transmits a data acquisition request to the device management service provider, and the device management service provider will transmit all data of a device table to the device table.

For the data source being the timing sequence database service provider, since the corresponding preferred processing field thereof is timestamp and the query field "timestamp" exists in the query condition included in the Nth logical subplan, it will be determined in step S60213 that the preferred processing field corresponding to the timing sequence database service provider is a query field of the query condition included in the logical subplan, and step S60214 will be executed after the end of step S60213, that is, the storage node transmits a query condition "h.timestamp between '2019-01-01' and '2019-01-02'" to the timing sequence database service provider, and the timing sequence database service provider filters a heartbeat table on the basis of the query condition so as to filter out records whose timestamp is from Jan. 1, 2019, 0:0:0 to Jan. 2, 2019, 0:0:0, and feed back the filtered records to the storage node.

S6022: the storage node judges whether a quantity of data sources associated with the logical subplan is greater than one.

In step S6022, when it is judged that a quantity of data sources associated with the logical subplan is greater than one, step S6023 is executed; and when it is judged that a quantity of data sources associated with the logical subplan is equal to one, Step S6024 is executed.

Step S6023: the storage node maps the data table provided by each data source associated with the logical subplan to a relational database.

The data structure differences among different data sources may be masked by step S6023.

The steps S6022 to S6023 are subject to exemplary description with the process of processing the Nth logical subplan as an example.

Since the quantity of data sources associated with the Nth logical subplan is two, it is determined in step S6022 that the quantity of data sources associated with the Nth logical subplan is greater than one, and then step S6023 will be executed. In step S6023, the storage node maps a device table that has not been subject to data filtering and a heartbeat table that has been subject to data filtering to a relational database, for the Nth worker node to execute a corresponding query plan on the basis of the relational database.

Step S6024: the storage node takes the data table provided by the one data source associated with the logical subplan as a database.

When the quantity of data sources associated with the logical subplan is one, the data table provided by the data source is directly used as a database, for the worker node to execute a corresponding query plan.

Step S7: the server node summarizes the received processing subresult and generates a final query result.

The server node aggregates the processing subresult reported by the worker node (possibly one or more, determined by a tree structure corresponding to the logical plan) to generate a final query result.

Step S8: the server node feeds back the final query result obtained by summarizing to a corresponding user.

Step S9: the server node transmits the logical plan to the coordinator node.

When the server node determines that the logical plan belongs to the OLTP scale query service, the total data query volume is relatively small, and the subsequent process may be performed according to a general query process.

Step S10: the coordinator node generates a second physical plan corresponding to the logical plan, and feeds back the second physical plan to the server node, the second physical plan recording node information of a worker node corresponding to the logical subplan.

The process of generating a physical plan may be referred to the foregoing description, and details are not described herein again. In step S10, since the logical plan as a whole task is not segmented, the second physical plan only records node information of a worker node that executes the logical plan.

Step S11: the server node assigns the logical plan to the corresponding worker node according to the second physical plan.

Step S12: the worker node processes the corresponding logical plan to obtain a final query result, and uploads the final query result to the server node.

In step S12, the logical plan processed by the worker node must be a query plan, and the result obtained by the worker node is the final query result, and there is no need for the server node to summarize later.

It should be noted that when the coordinator node generates the second physical plan corresponding to the logical plan, since the total data query volume is relatively small, the server node may also be used as the worker node to execute the logical plan if the server node has remaining resources.

Step S13: the server node feeds back the received final query result to the corresponding user.

Embodiment of the present disclosure provide a query processing method, which may select different processing flows on the basis of a scale of data corresponding to a query request, and the query processing method may simultaneously support an OLAP scale query service and an OLTP scale query service, thus meeting query needs in the field of Internet of Things.

In addition, for joint query across multiple data sources, embodiments of the present disclosure provide a storage node which may map different data tables provided by different data sources to a form of a relational database, which makes a joint query across services become possible.

Furthermore, the user may make a one-stop data query in multiple data sources with the SQL language as usual to access a relational database.

Figure 6:
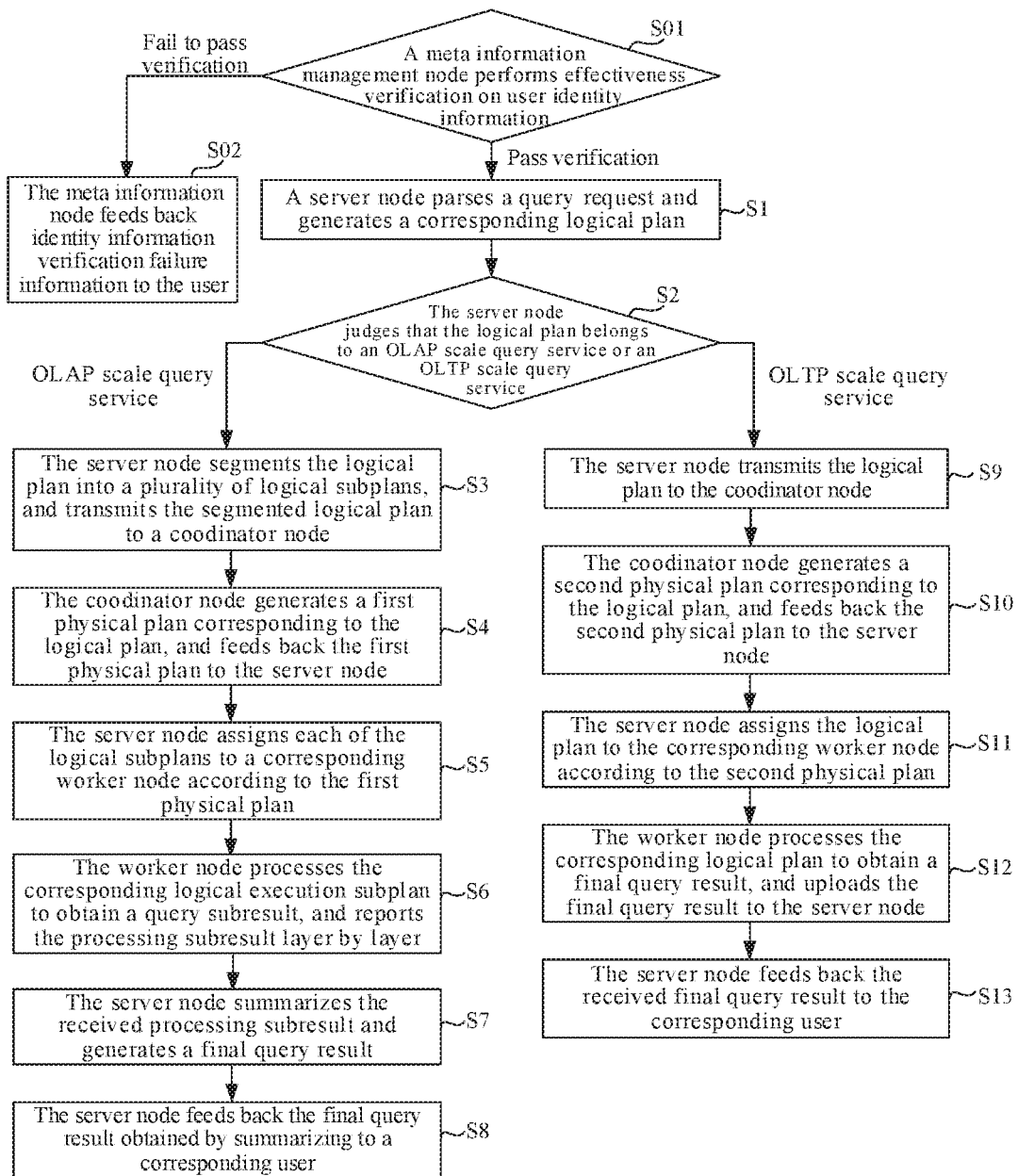
FIG. 6 is a flowchart of another query processing method according to an embodiment of the present disclosure.

FIG. 6 is a flowchart of another query processing method according to an embodiment of the present disclosure. As shown in FIG. 6, different from the embodiment shown in FIG. 1, the present embodiment includes not only the step S1 to step S13 in the foregoing embodiment, but also includes step S01 and step S02. For the description of steps S1 to S13, refer to the contents above, and only step S01 and step S02 are described in detail below.

Step S01: a meta information management node performs effectiveness verification on user identity information.

In step S01, if the user identity information passes the effectiveness verification, step S1 is executed; and if the user identity information fails to pass the effectiveness verification, step S02 is executed.

Step S02: the meta information node feeds back identity information verification failure information to the user.

In the present embodiment, the meta information management node may implement the effectiveness verification on the user identity information.

Figure 7A:
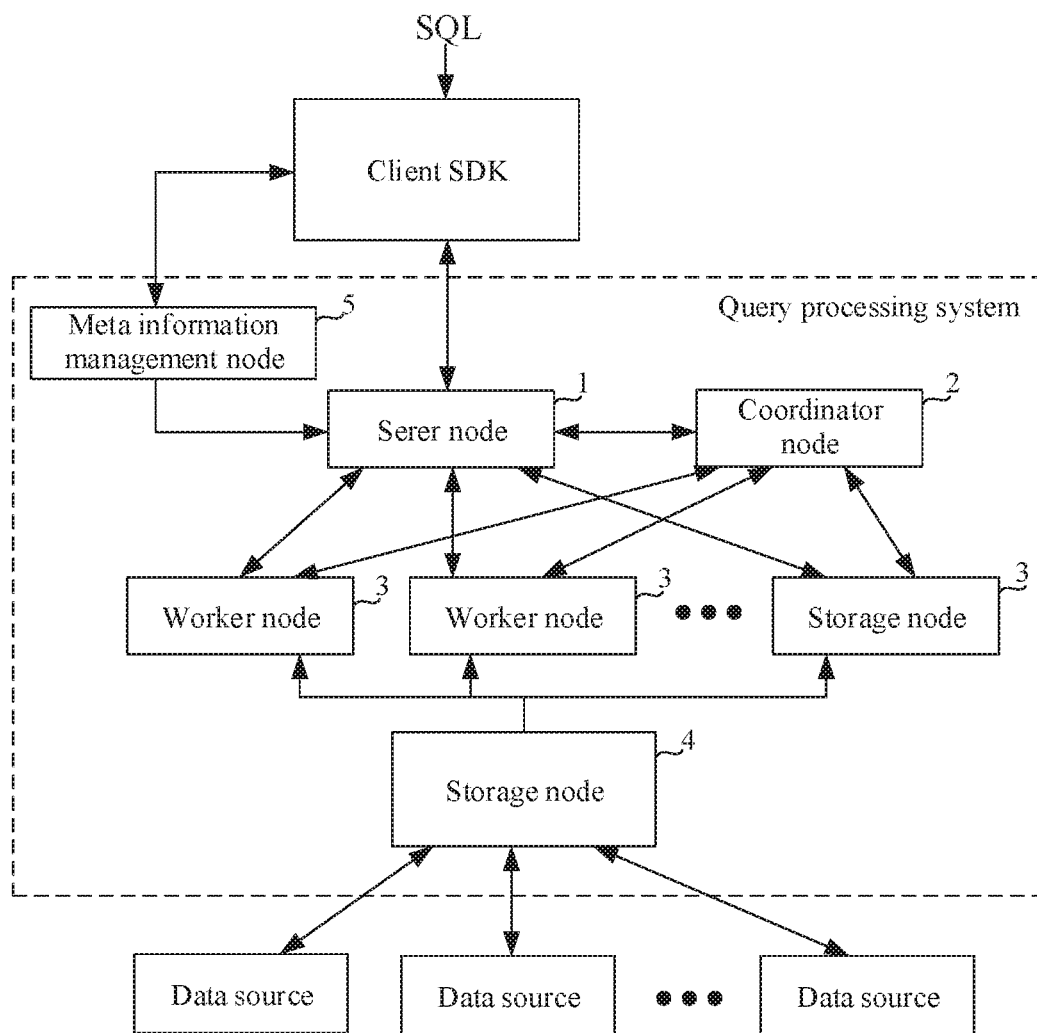
FIG. 7A is a structural block diagram of a query processing system according to an embodiment of the present disclosure.
Figure 7B:
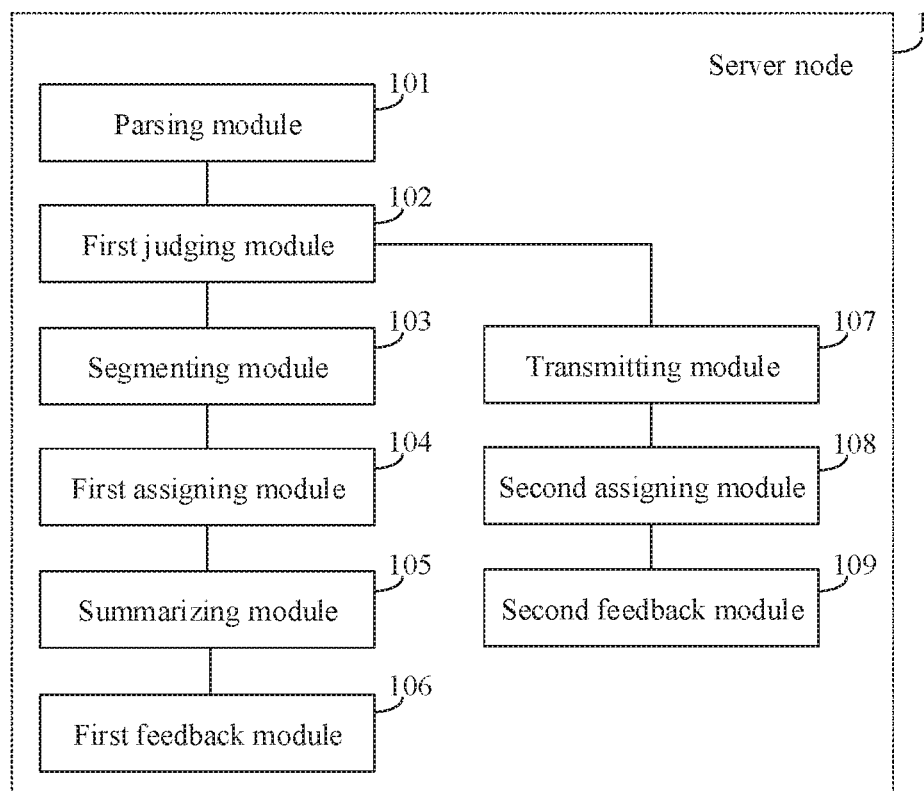
FIG. 7B-FIG. 7F are structural block diagrams of a server node, a coordinator node, a worker node, a storage node, and a meta information management node according to some embodiments of the present disclosure.
Figure 7C:
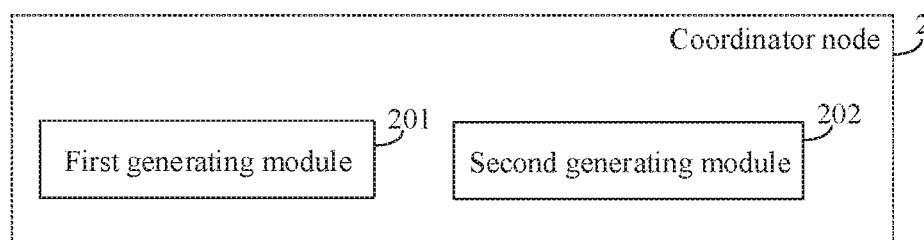
Figure 7D:
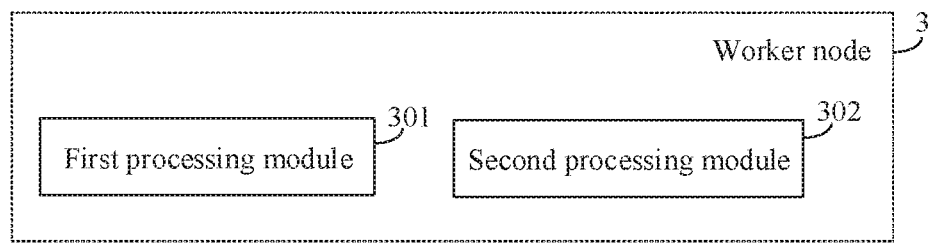
Figure 7E:
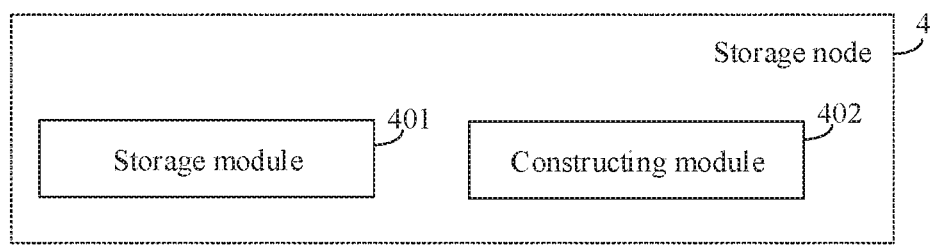

FIG. 7a is a structural block diagram of a query processing system according to an embodiment of the present disclosure, and FIG. 7B to FIG. 7F are respectively structural block diagrams of a server node, a coordinator node, a worker node, a storage node and a meta information management node in some embodiments of the present disclosure. As shown in FIG. 7A to FIG. 7F, the query processing system may be used to implement the query processing method in the foregoing embodiments, and the query processing system includes a server node 1, a coordinator node 2 and a plurality of worker nodes 3. The server node 1 includes a parsing module 101, a first judging module 102, a segmenting module 103, a first assigning module 104, a summarizing module 105 and a first feedback module 106; the coordinating node 2 includes a first generating module 201; and the worker node 3 includes a first processing module 301.

The parsing module 101 is configured for parsing a query request and generating a corresponding logical plan.

The first judging module 102 is configured for judging that the logical plan belongs to an OLAP scale query service or an OLTP scale query service.

The segmenting module 103 is configured for segmenting the logical plan into a plurality of logical subplans in response to n the first judging module 102 judging that the logical plan belongs to the OLAP range query service, and transmitting the segmented logical plan to the coordinator node 2.

The first generating module 201 is configured for generating a first physical plan corresponding to the logical plan received from the segmenting module 103, and feeding back the first physical plan to the server node 1, the first physical plan recording node information of a worker node 3 corresponding to each of the logical subplans.

The first assigning module 104 is configured for assigning each of the logical subplans to a corresponding worker node 3 according to the first physical plan.

The first processing module 301 is configured for processing the corresponding logical execution subplan to obtain a query subresult, and reporting the processing subresult layer by layer.

The summarizing module 105 is configured for summarizing the received processing subresult and generating a final query result.

The first feedback module 106 is configured for feeding back the final query result to a corresponding user.

In some embodiments, the server node 1 further includes a transmitting module 107, a second assigning module 108 and a second feedback module 109; the coordinator node 2 further includes a second generating module 202; and the worker node 3 further includes a second processing module 302.

The transmitting module 107 is configured for transmitting the logical plan to the coordinator node 2 in response to the first judging module 102 judging that the logical plan belongs to the OLTP scale query service.

The second generating module 202 is configured for generating a second physical plan corresponding to the logical plan received from the segmenting module 107, and feeding back the second physical plan to the server node 1, the second physical plan recording node information of the worker node 3 corresponding to the logical plan.

The second assigning module 108 is configured for assigning the logical plan to the corresponding worker node 3 according to the second physical plan.

The second processing module 302 is configured for processing the corresponding logical plan to obtain a final query result, and uploading the final query result to the server node 1.

The second feedback module 109 is configured for feeding back the received final query result to a corresponding user.

In some embodiments, the query processing system further includes a storage node 4, where the storage node includes a storage module 401 prestoring data volume information of each data source.

Figure 8:
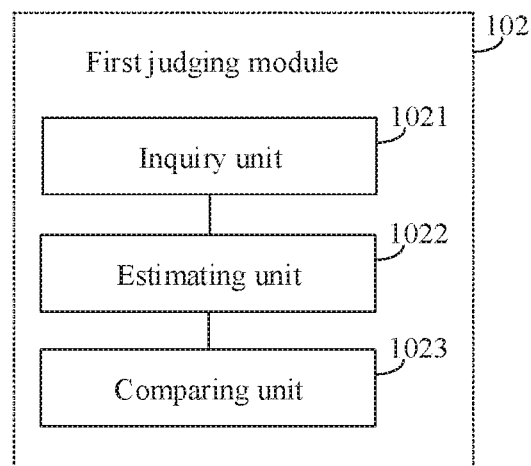
FIG. 8 is a structural block diagram of a first judging module according to an embodiment of the present disclosure.

FIG. 8 is a structural block diagram of a first judging module 102. As shown in FIG. 8, the first judging module 102 includes an inquiry unit 1021, an estimating unit 1022 and a comparing unit 1023.

The inquiry unit 1021 is configured for inquiring of the storage node 4 about a data volume of each data source associated with the logical plan.

The estimating unit 1022 is configured for estimating a total data query volume corresponding to the logical plan according to the data volume of the each data source associated with the logical plan that is fed back by the storage node 4.

The comparing unit 1023 is configured for comparing the total data query volume and a predetermined total query volume.

The first judging module 102 is configured for, in response to the comparing unit 1023 determining that the total data query volume is greater than the predetermined total query volume, judging that the logical plan belongs to the OLAP scale query service; and in response to the comparing unit 1023 determining that the total data query volume is less than or equal to the predetermined total query volume, judging that the logical plan belongs to the OLTP scale query service.

Figure 9:
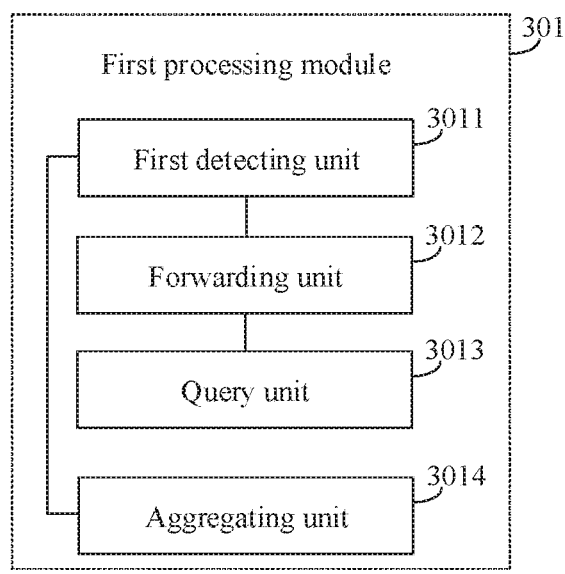
FIG. 9 is a structural block diagram of a first processing module according to an embodiment of the present disclosure.

FIG. 9 is a structural block diagram of a first processing module according to an embodiment of the present disclosure. As shown in FIG. 9, in some embodiments, the first processing module 301 includes a first detecting unit 3011, a forwarding unit 3012 and a query unit 3013. The query processing system further includes a storage node 4 which includes a constructing module 402.

The first detecting unit 3011 is configured for detecting that the logical subplan received by the worker node 3 belongs to the query plan or the aggregation plan.

The forwarding node 3012 is configured for forwarding the logical subplan to the storage node 4 in response to the first detecting unit 3011 detecting that the logical subplan received by the worker node 3 belongs to the query plan, for the storage node 4 to construct a database for the logical subplan.

The query unit 3013 is configured for executing a corresponding query operation in the database for the logical subplan that is constructed by the storage node 4, so as to obtain a corresponding query subresult.

The constructing module 402 is configured for constructing a database for the logical subplan in response to the storage node 4 receiving the logical subplan from the worker node 3.

Further referring to FIG. 9, in some embodiments, the first processing module 301 further includes an aggregating unit 3014 configured for receiving a query subresult reported by a subordinate worker node 3 and aggregates the received query subresult in response to the first detecting unit 3011 detecting that the logical subplan received by the worker node 3 belongs to the aggregation plan.

Figure 10:
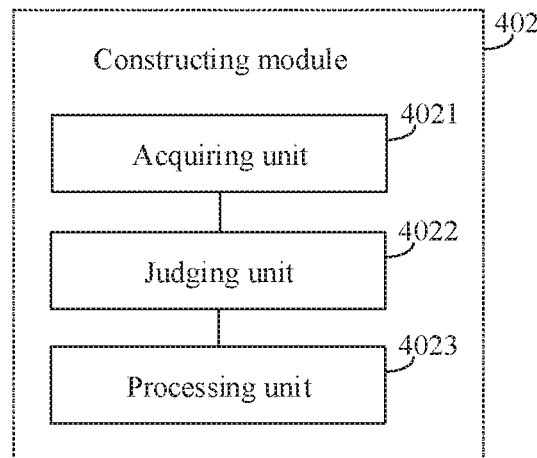
FIG. 10 is a structural block diagram of a constructing module according to an embodiment of the present disclosure.

FIG. 10 is a structural block diagram of a constructing module according to an embodiment of the present disclosure. As shown in FIG. 10, the constructing module 402 includes an acquiring unit 4021, a judging unit 4022 and a processing unit 4023.

The acquiring unit 4021 is configured for acquiring a data table provided by a data source associated with the logical subplan according to the received logical subplan.

The judging unit 4022 is configured for judging whether a quantity of data sources associated with the logical subplan is greater than one.

The processing unit 4023 is configured for mapping the data table provided by each data source associated with the logical subplan to a relational database in response to the judging unit 4022 judging that the quantity of data sources associated with the logical subplan is greater than one, and taking the data table provided by the one data source associated with the logical subplan as a database in response to the judging unit 4022 judging that the quantity of data sources associated with the logical subplan is equal to one.

Figure 11:
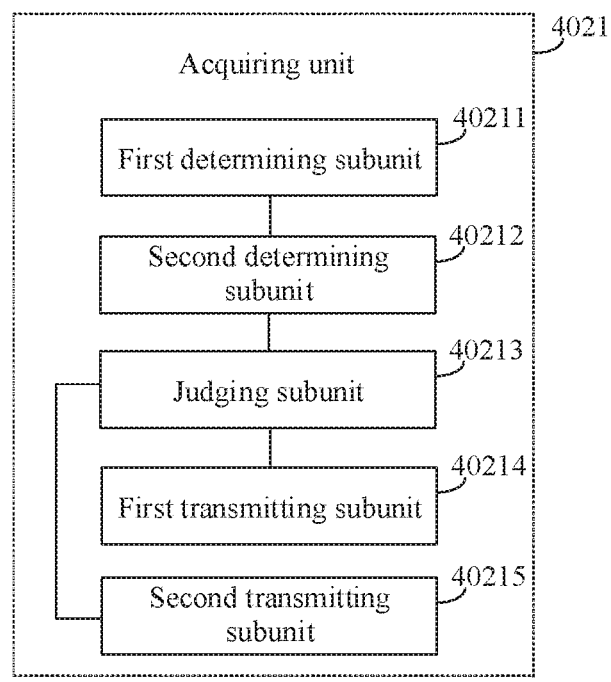
FIG. 11 is a structural block diagram of an acquiring unit according to an embodiment of the present disclosure.

FIG. 11 is a structural block diagram of an acquiring unit according to an embodiment of the present disclosure. As shown in FIG. 11, in some embodiments, the acquiring unit 4021 includes a first determining subunit 40211, a second determining subunit 40212, a judging subunit 40213, a first transmitting subunit 40214 and a second transmitting subunit 40215.

The first determining subunit 40211 is configured for determining a data source associated with the logical subplan.

The second determining subunit 40212 is configured for determining, from a pre-stored corresponding relationship table, a preferred processing field corresponding to the each data source associated with the logical subplan, the corresponding relationship table recording different data sources and preferred processing field corresponding thereto.

The judging subunit 40213 is configured for, for each data source associated with the logical subplan, judging whether a preferred processing field corresponding to the data source associated with the logical subplan is a query field of a query condition included in the logical subplan.

The first transmitting subunit 40214 is configured for transmitting a query condition of the preferred processing field corresponding to the data source in the logical subplan to the data source in response to the judging subunit 40213 judging that the preferred processing field corresponding to the data source is a query field of the query condition included in the logical subplan, for the data source to filter a data table stored therein according to the received query condition and then feed back the filtered data table to the storage node 4.

The second transmitting subunit 40215 is configured for transmitting a data acquisition request to the data source in response to the judging subunit 40213 judging that the preferred processing field corresponding to the data source is not a query field of the query condition included in the logical subplan, for the data source to feed back its own data table.

Figure 7F:
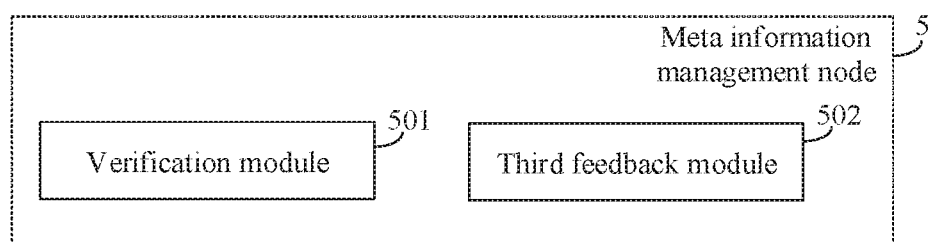

Referring to FIG. 7F, in some embodiments, the query processing system further includes a meta information management node 5 which includes a verification module 501 and a third feedback module 502. The verification module 501 is configured for performing effectiveness verification on user identity information, and the third feedback module 502 is configured for allowing the meta information management node 5 to feed back identity information verification failure information to the user in response to that the user identity information fails to pass the effectiveness verification.

At this time, the parsing module 101 is specifically configured for parsing the query request and generating a corresponding logical plan in response to that the user identity information passes the effectiveness verification.

The description of the foregoing modules, units and subunits may refer to the description of each step in the query processing method, which will not be repeatedly described herein.

An embodiment of the present disclosure further provides a server, including: one or more processors and a storage apparatus, where the storage device stores one or more programs, and the one or more programs, when executed by the one or more processors, cause the one or more processors to implement the query processing method provided in the embodiments above.

An embodiment of the present disclosure further provides a computer readable storage medium storing a computer program, where the computer program, when executed by a processor, implements the query processing method provided in the embodiments above.

Those of ordinary skill in the art will appreciate that all or some of the steps, functional modules/units in the disclosed apparatus may be implemented as software, firmware, hardware or suitable combinations thereof. In a hardware implementation, the division between functional modules/units mentioned in the description does not necessarily correspond to the division of physical components. For example, a physical component may have multiple functions, or one function or step may be executed by several physical components together. Some or all physical components may be implemented as software executed by a processor, such as a central processing unit, a digital signal processor or a microprocessor, or implemented as hardware, or implemented as an integrated circuit such as a specific integrated circuit. Such software may be distributed in a computer readable medium which may include a computer storage medium (or a non-transitory medium) and a communication medium (or a transitory medium). As is well known to those of ordinary skill in the art, the term "computer storage medium" includes volatile and non-volatile, removable and non-removable media implemented in any method or technology for storage of information such as computer-readable instructions, data structures, program modules or other data. The computer storage medium includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Moreover, it is well known to those of ordinary skill in the art that the communication medium typically includes computer readable instructions, data structures, program modules, or other data in a modulated data signal, such as a carrier wave or other transport mechanism, and may include any information delivery medium.

The exemplary embodiments have been disclosed herein. Although specific terms are employed, such terms are intended to be used only as a generic description and are not intended to be limiting. In some examples, it is apparent to those skilled in the art that the features, characteristics and/or elements described in connection with the specific embodiments may be used alone, or the features, characteristics and/or elements described in connection with other embodiments may be used in a combining method, unless otherwise specifically indicated. Accordingly, it will be understood by those skilled in the art that various changes in form and detail may be made without departing from the scope of the present disclosure.

What is claimed is:

1. A query processing method, comprising:
   parsing, by a server node, a query request and generating a corresponding logical execution plan, the server node comprising a hardware processor;
   judging, by the server node, that the logical plan belongs to an OLAP scale query service or an OLTP scale query service;
   in response to judging that the logical plan belongs to the OLAP scale query service, segmenting, by the server node, the logical plan into a plurality of logical subplans, and transmitting the segmented logical plan to a coordinator node;
   generating, by the coordinator node, a first physical plan corresponding to the logical plan, and feeding back the first physical plan to the server node, the first physical plan recording node information of a worker node corresponding to each of the logical subplans;
   assigning, by the server node, each of the logical subplans to a corresponding worker node according to the first physical plan;
   processing, by the worker node, the corresponding logical subplan to obtain a query subresult, and reporting the processing subresult layer by layer; and
   summarizing, by the server node, the received processing subresult, generating a final query result, and feeding back the final query result to a user, wherein the judging, by the server node, that the logical plan belongs to an OLAP scale query service or an OLTP scale query service comprises:
   inquiring, by the server node, of a storage node about a data volume of each data source associated with the logical plan;
   estimating, by the server node, a total data query volume corresponding to the logical plan according to the data volume, of the each data source associated with the logical plan, fed back by the storage node;
   comparing, by the server node, the total data query volume and a predetermined total query volume; and
   judging, by the server node, that the logical plan belongs to the OLAP scale query service in response to determining the total data query volume being greater than the predetermined total query volume, and judging, by the server node, that the logical plan belongs to the OLTP scale query service in response to determining the total data query volume being less than or equal to the predetermined total query volume.

2. The method according to claim 1, wherein in response to judging that the logical plan belongs to the OLTP scale query service, transmitting, by the server node, the logical plan to the coordinator node;
   generating, by the coordinator node, a second physical plan corresponding to the logical plan, and feeding back the second physical plan to the server node, the second physical plan recording node information of the worker node corresponding to the logical plan;
   assigning, by the server node, the logical plan to the corresponding worker node according to the second physical plan;
   processing, by the worker node, the corresponding logical plan to obtain a final query result, and uploading the final query result to the server node; and
   feeding back, by the server node, the received final query result to the user.

3. The query processing method according to claim 1, wherein the processing, by the worker node, the corresponding logical subplan comprises:
   detecting, by the worker node, that the received logical subplan belongs to the query plan or the aggregation plan;
   in response to detecting that the received logical subplan belongs to the query plan, forwarding, by the worker node, the logical subplan to a storage node for the storage node to construct a database for the logical subplan; and
   executing, by the worker node, a corresponding query operation in the database for the logical subplan constructed by the storage node, to obtain a corresponding query subresult,
   wherein when the storage node receives the logical subplan from the worker node, the method further comprises: constructing, by the storage node, a database for the logical subplan.

4. The method according to claim 3, wherein in response to detecting that the received logical subplan belongs to the aggregation plan, receiving, by the worker node, a query subresult reported by a lower-level worker node, and aggregating the received query subresult.

5. The method according to claim 3, wherein the constructing, by the storage node, a database for the logical subplan comprises:
  acquiring, by the storage node, a data table provided by a data source associated with the logical subplan according to the received logical subplan;
  judging, by the storage node, whether a quantity of data sources associated with the logical subplan is greater than one;
  in response to judging that the quantity of data sources associated with the logical subplan is greater than one, mapping, by the storage node, the data table provided by each data source associated with the logical subplan to a relational database; and
  in response to judging that the quantity of data sources associated with the logical subplan is equal to one, taking, by the storage node, the data table provided by the one data source associated with the logical subplan as a database.

6. The method according to claim 5, wherein the acquiring, by the storage node, a data table provided by a data source associated with the logical subplan according to the received logical subplan comprises:
  determining, by the storage node, the data source associated with the logical subplan;
  determining, by the storage node, from a pre-stored corresponding relationship table, a preferred processing field corresponding to each data source associated with the logical subplan, the corresponding relationship table recording different data sources and corresponding preferred processing fields;
  for each data source associated with the logical subplan, judging, by the storage node, whether a preferred processing field corresponding to the data source associated with the logical subplan is a query field of a query condition included in the logical subplan;
  in response to judging that the preferred processing field corresponding to the data source is a query field of the query condition included in the logical subplan, transmitting, by the storage node, a query condition of the preferred processing field corresponding to the data source in the logical subplan to the data source, for the data source to filter a data table stored in the data source according to the received query condition and then feeding back the filtered data table to the storage node; and
  in response to judging that the preferred processing field corresponding to the data source is not a query field of the query condition included in the logical subplan, transmitting, by the storage node, a data acquisition request to the data source, for the data source to feed back its own data table.

7. The query processing method according to claim 1, wherein before parsing, by the server node, the query request and generating the corresponding logical execution plan, the method further comprises:
  performing, by a meta information management node, effectiveness verification on user identity information;
  parsing, by the server node, the query request and generating the corresponding logical plan in response to that the user identity information passes the effectiveness verification; and
  feeding back, by the meta information management node, identity information verification failure information to the user in response to that the user identity information fails to pass the effectiveness verification.

8. A query processing system, comprising a server node, a coordinator node and a plurality of worker nodes, wherein:
  the server node is configured for: parsing a query request and generating a corresponding logical plan; judging that the logical plan belongs to an OLAP scale query service or an OLTP scale query service; and segmenting the logical plan into a plurality of logical subplans in response to the first judging module judging that the logical plan belongs to the OLAP range query service, and transmitting the segmented logical plan to the coordinator node, wherein the server node comprises a hardware processor;
  the coordinator node is configured for: generating a first physical plan corresponding to the logical plan, and feeding back the first physical plan to the server node, the first physical plan recording node information of a worker node corresponding to each of the logical subplans;
  the server node is further configured for: assigning each of the logical subplans to a corresponding worker node according to the first physical plan;
  the worker node is configured for: processing the corresponding logical subplan to obtain a query subresult, and reporting the processing subresult layer by layer; and
  the server node is further configured for: summarizing the received processing subresult and generating a final query result; and feeding back the final query result to a user, wherein the system further comprises a storage node, the storage node prestoring data volume information of each data source;
  wherein the server node is further configured for:
  inquiring of the storage node about a data volume of each data source associated with the logical plan;
  estimating a total data query volume corresponding to the logical plan according to the data volume, of the each data source associated with the logical plan, fed back by the storage node:
  comparing the total data query volume and a predetermined total query volume; and
  in response to determining that the total data query volume is greater than the predetermined total query volume, judging that the logical plan belongs to the OLAP scale query service; and in response to determining that the total data query volume is less than or equal to the predetermined total query volume, judging that the logical plan belongs to the OLTP scale query service.

9. The system according to claim 8, wherein the server node is further configured for transmitting the logical plan to the coordinator node in response to judging that the logical plan belongs to the OLTP scale query service;
  the coordinator node is further configured for generating a second physical plan corresponding to the logical plan, and feeding back the second physical plan to the server node, the second physical plan recording node information of the worker node corresponding to each of the logical subplans;
  the server node is further configured for assigning each of the logical subplans to the corresponding worker node according to the second physical plan;
  the worker node is further configured for processing the corresponding logical plan to obtain a final query result, and uploading the final query result to the server node; and the server node is further configured for feeding back the final query result to the user.

10. The query processing system according to claim 8, wherein the worker node is configured for:
   detecting that the received logical subplan belongs to the query plan or the aggregation plan;
   forwarding the logical subplan to the storage node in response to detecting that the received logical subplan belongs to the query plan, for the storage node to construct a database for the logical subplan; and
   executing a corresponding query operation in the database for the logical subplan constructed by the storage node, to obtain a corresponding query subresult; and
   wherein the storage node is configured for constructing a database for the logical subplan in response to receiving the logical subplan from the worker node.

11. The query processing system according to claim 10, wherein the worker node is further configured for receiving a query subresult reported by a lower-level worker node and aggregating the received query subresult in response to detecting that the received logical subplan belongs to the aggregation plan.

12. The query processing system according to claim 10, wherein the storage node is specifically configured for:
   acquiring a data table provided by a data source associated with the logical subplan according to the received logical subplan;
   judging whether a quantity of data sources associated with the logical subplan is greater than one; and
   mapping the data table provided by each data source associated with the logical subplan to a relational database in response to judging that the quantity of data sources associated with the logical subplan is greater than one, and taking the data table provided by the one data source associated with the logical subplan as a database in response to judging that the quantity of data sources associated with the logical subplan is equal to one.

13. The query processing system according to claim 12, wherein the storage node is further configured for:
   determining a data source associated with the logical subplan;
   determining, from a pre-stored corresponding relationship table, a preferred processing field corresponding to the each data source associated with the logical subplan, the corresponding relationship table recording different data sources and corresponding preferred processing field;
   for each data source associated with the logical subplan, judging whether a preferred processing field corresponding to the data source associated with the logical subplan is a query field of a query condition included in the logical subplan;
   transmitting a query condition of the preferred processing field corresponding to the data source in the logical subplan to the data source in response to judging that the preferred processing field corresponding to the data source is a query field of the query condition included in the logical subplan, for the data source to filter a data table stored in the data source according to the received query condition and then feed back the filtered data table to the storage node; and
   transmitting a data acquisition request to the data source in response to judging that the preferred processing field corresponding to the data source is not a query field of the query condition included in the logical subplan, for the data source to feed back its own data table.

14. The query processing system according to claim 8, further comprising a meta information management node;
   wherein the meta information management node is configured for:
   performing effectiveness verification on user identity information; and
   feeding back identity information verification failure information to the user in response to that the user identity information fails to pass the effectiveness verification; and
   wherein the server node is further configured for parsing the query request and generating the corresponding logical plan in response to that the user identity information passes the effectiveness verification.

15. A server, comprising:
   one or more processors; and
   a storage apparatus, storing one or more programs,
   wherein the one or more programs, when executed by the one or more processors, cause the one or more processors to implement the method according to claim 1.

16. A non-transitory computer readable medium, storing a computer program, wherein the program, when executed by a processor, implements the method according to claim 1.

* * * * *